United States Patent [19]

Skinner et al.

[11] Patent Number: 5,570,890
[45] Date of Patent: Nov. 5, 1996

[54] EXPANDABLE COMPRESSION RING

[75] Inventors: James W. Skinner; William O. Skinner; Fouad M. Deeb; Ronald W. Neuhaus, all of Fort Wayne; Michael R. Miller, Churubusco, all of Ind.

[73] Assignee: Press Seal Gasket Corporation, Fort Wayne, Ind.

[21] Appl. No.: 473,258

[22] Filed: Jun. 7, 1995

Related U.S. Application Data

[62] Division of Ser. No. 30,816, Mar. 12, 1993, abandoned.

[51] Int. Cl.⁶ ................................................. F16J 15/00
[52] U.S. Cl. ........................... 277/101; 277/155; 285/237; 285/370
[58] Field of Search ................................. 277/101, 138, 277/147, 154, 155, 156, 212 FB; 285/237, 162, 921, 370

[56] References Cited

U.S. PATENT DOCUMENTS

| | | |
|---|---|---|
| 1,117,083 | 11/1914 | Patchell . |
| 1,211,692 | 1/1917 | Endebrock et al. . |
| 1,274,038 | 7/1918 | Hilker . |
| 1,359,596 | 11/1920 | Hill . |
| 1,768,392 | 6/1930 | Benien . |
| 3,293,978 | 12/1966 | Handley . |
| 3,406,988 | 10/1968 | Jones . |
| 3,449,916 | 6/1969 | Tabor . |
| 3,656,771 | 4/1972 | Stout . |
| 3,700,265 | 10/1972 | Dufour et al. . |
| 3,759,280 | 9/1973 | Swanson . |
| 3,808,937 | 5/1974 | Roehrig . |
| 3,813,116 | 5/1974 | Horsley . |
| 3,814,409 | 6/1974 | Prasse . |
| 3,866,925 | 2/1975 | Maimstrom et al. . |
| 3,958,313 | 5/1976 | Rossborough . |
| 3,973,783 | 8/1976 | Skinner et al. . |
| 4,017,089 | 4/1977 | Kurata et al. . |
| 4,103,901 | 8/1978 | Ditcher . |
| 4,203,190 | 5/1980 | Temple et al. . |
| 4,215,868 | 8/1980 | Skinner et al. . |
| 4,242,164 | 12/1980 | Skinner . |
| 4,281,944 | 8/1981 | Bowman . |
| 4,387,900 | 6/1983 | Ditcher et al. . |
| 4,466,219 | 8/1984 | Campolito . |
| 4,487,437 | 10/1984 | Skinner . |
| 4,582,450 | 4/1986 | Neil . |
| 4,702,645 | 10/1987 | Skinner et al. . |

(List continued on next page.)

FOREIGN PATENT DOCUMENTS

| | | |
|---|---|---|
| 0021454 | 1/1981 | European Pat. Off. . |
| 1526123 | 9/1978 | United Kingdom . |

*Primary Examiner*—Daniel G. DePumpo
*Attorney, Agent, or Firm*—Barnes & Thornburg

[57] ABSTRACT

An integrally molded compression ring for exerting an outwardly, radially directed force on an inner surface of a gasket to compress the gasket into sealing engagement with a wall of an opening. The compression ring is made from a one-piece body or strip of resiliently flexible material that has a substantially continuous and uninterrupted exterior circumferential surface. Lugs formed on an interior portion of the strip cooperate with a force expansion unit to move the ring into an expanded position. A recess may also be provided in one end of the strip for cooperating with the force expansion unit. Projections integrally molded on an interior portion of the strip and on an exterior portion adjacent an end of the strip engage one another to lock the ring in an expanded position. Guiding structure may be formed on the strip that prevent lateral movement of the ends of the strip relative to one another when the strip is formed into a ring. The end of the strip and a portion adjacent thereto that overlap the other end of the strip when it is formed into a ring taper to a feather edge. The ring may be formed so as to be expandable into multiple locked positions. An alternative embodiment of the compression ring has integrally molded first and second portions. Distal ends of the second portion may also taper to a feather edge. This ring may also be formed so as to be expandable into multiple locked positions.

9 Claims, 2 Drawing Sheets

U.S. PATENT DOCUMENTS

| | | |
|---|---|---|
| 4,711,455 | 12/1987 | Ditcher et al. . |
| 4,746,127 | 5/1988 | Westhoff et al. . |
| 4,864,684 | 9/1989 | Gellenthin, Jr. . |
| 4,878,389 | 11/1989 | Boge ............................ 277/212 FB |
| 4,890,863 | 1/1990 | Westhoff et al. . |
| 4,903,970 | 2/1990 | Ditcher et al. . |
| 5,054,794 | 10/1991 | Westhoff et al. . |
| 5,150,927 | 9/1992 | Skinner . |

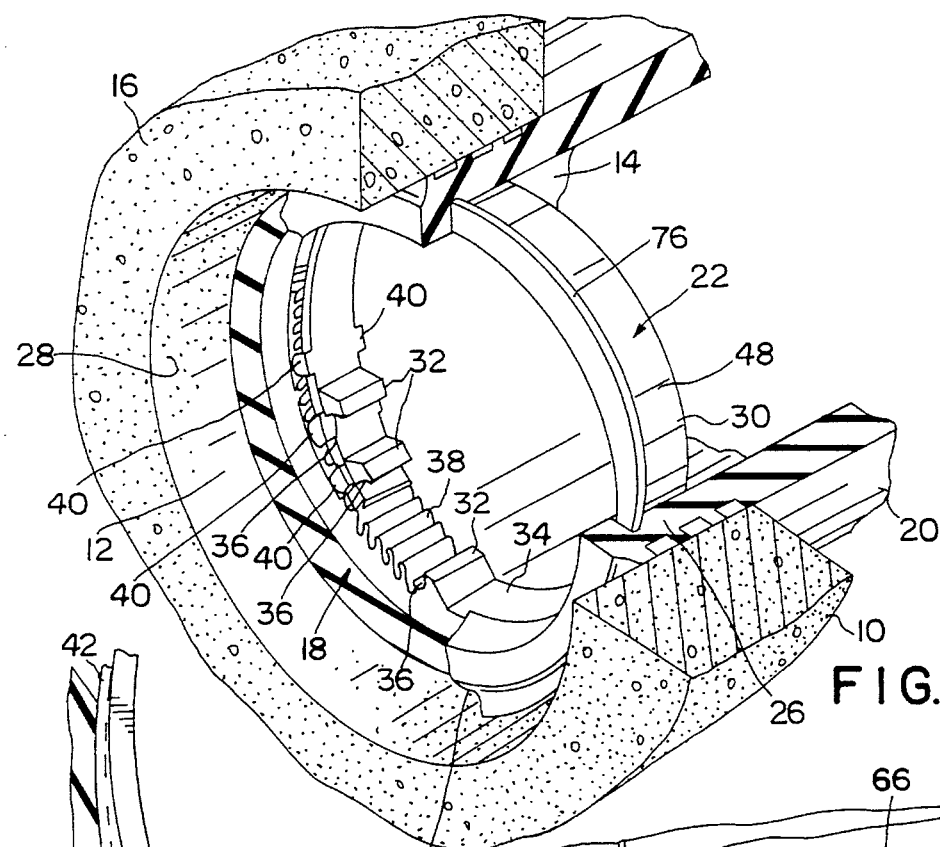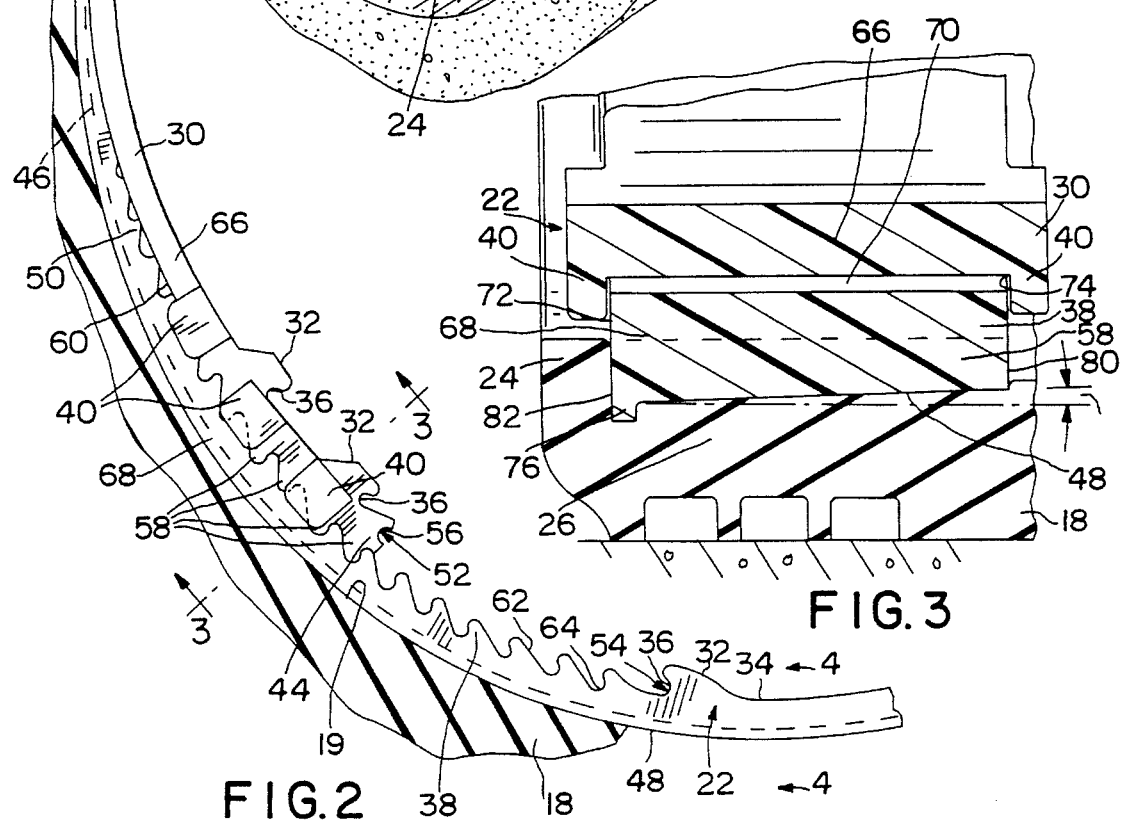

EXPANDABLE COMPRESSION RING

This is a divisional of Application Ser. No. 08/030,816, filed Mar. 12 1993 now abandoned.

BACKGROUND AND SUMMARY OF THE INVENTION

The present invention relates to an expandable seal arrangement. More particularly, the present invention relates to an expandable compression ring for exerting an outwardly, radially directed force on an inner surface of a gasket to compress said gasket into sealing arrangement with a wall of an opening.

Compressing rings may be used to clamp an exterior surface of a resilient gasket surrounding a pipe into an opening in which the pipe is inserted. The gasket used is typically constructed of an elastomeric material and, when clamped into position, provides a fluid-tight seal between the pipe and the opening. Clamping is accomplished by expanding the compression ring against the interior surface of the gasket.

Several designs for clamping bands exist. For example, U.S. Pat. No. 5,054,794 to Westhoff et al. discloses an expansion ring formed from a C-shaped annular, metal band and a generally S-shaped spanning member. The C-shaped annular band has a circumference of less than 360° such that a gap exists between first and second ends of the annular band. The annular band also has a generally U-shaped channel into which the spanning member is disposed. A first end of the spanning member is welded into the generally U-shaped channel of the annular band. A second end of the spanning member has a locking tongue formed thereon that engages a locking member welded in the U-shaped channel of the annular band. A guide member is also welded in the U-shaped channel of the annular band and holds the spanning member therein. At least two disadvantages exist with the design of Westhoff et al. The first is that the gap between the first and second ends of the annular band presents a discontinuity to the inner surface of the gasket in which it is disposed. During expansion of the ring of Westhoff et al., this circumferential discontinuity will result in a non-uniform pressure surface area being exerted on the inner surface of the gasket. Westhoff et al. also suffers from the disadvantage that it is formed from multiple pieces of metal that require numerous welding operations for assembly.

Another example is U.S. Pat. No. 4,478,437 which is assigned to the assignee of the present invention. This patent discloses a radially expandable locking sleeve preferably formed of a flat steel strip of substantially uniform thickness. The sleeve is formed in an annular shape and has interlocking end portions. The ends portions lock the sleeve into a single expanded position. The outer circumferential surface of the locking sleeve presents a substantially uninterrupted pressure surface to the gasket, including across the interlocking ends portions.

A further example is U.S. Pat. No. 5,150,927, also assigned to the assignee of the present invention. This patent discloses a sliding sleeve and a radially expandable compression sleeve. The sliding sleeve is positioned adjacent the portion of the inner surface of the gasket to be expanded. The compression sleeve is disposed immediately adjacent the sliding sleeve which serves as a slip plate during expansion of the compression sleeve. The sliding sleeve may be attached to or integrally molded into the inner surface of the tubular gasket. The compression sleeve may be a one-or two-piece assembly that is expandable into multiple locked positions. Locking is accomplished via engagement of radially inwardly and outwardly facing teeth. The inwardly facing teeth are received in well-shaped tooth receiving recesses.

Applicant makes no representation by this discussion, nor should any such representation be inferred, that an exhaustive search of all relevant prior art has been conducted, or that no more pertinent prior art exists.

The arrangements described in U.S. Pat. Nos. 4,478,437 and 5,150,927 work well for their intended purpose. Each has its own advantages and a design that incorporated these advantages as well as providing additional ones would be a welcome improvement. Accordingly, a compression ring for exerting an outwardly, radially directed force on an inner surface of a gasket to compress the gasket into sealing engagement with a wall of an opening is provided. The subject invention has an integrally molded one-piece body or strip of resiliently flexible material. The body or strip has a substantially continuous and uninterrupted exterior circumferential surface. This exterior surface exerts a generally uniform pressure on an inner surface of the gasket. The strip has first and second ends. The first end overlaps the second end when the strip or body is formed into a ring. Integrally molded means on the body or strip cooperate with force exerting means to move the body or strip into an expanded position. In addition, means integrally molded on the body or strip lock the same into the expanded position. In preferred embodiments, the ring is integrally formed from plastic. The first end of the body or strip and a portion adjacent thereto may taper to a feather edge so as to provide the substantially continuous and uninterrupted circumferential surface. The cooperating means may comprise one or more lugs on a surface of the body or strip, for example, the interior surface of the body or strip. The cooperating means may further comprise holding means on the second end of the body or strip. The holding means may be a recess formed in the second end.

The locking means may comprise integrally molded cooperating projections on separate portions of the strip or body. The projections may be teeth-like structures a set of which are on an interior portion of the body or strip and a set of which are on an exterior portion of the body or strip adjacent the second end thereof. The teeth on one portion of the body or strip may be angled in a first direction and the teeth on the other portion of the body or strip may be angled in a second direction opposite the first direction.

The ring may further comprise guide means for limiting lateral movement of the first and second ends of the body or strip relative to one another. The guide means may comprise at least two opposing tabs on an exterior surface of the body or strip.

The compression ring may further include anchoring means integrally molded on the body or strip for securing the same against lateral movement in the gasket. The anchoring means may circumferentially extend around at least a portion of an exterior surface of the body or strip. The anchoring means may be a generally continuous protrusion that extends substantially orthogonally from the exterior surface of the body or strip.

The ring may be formed so that the body or strip thereof is expandable into multiple locked positions.

In another embodiment of the present invention, the compression ring comprises integrally molded first and second portions made from resiliently flexible material. In preferred embodiments, the ring is integrally formed from plastic. Means integrally molded on the first portion for cooperating with the force exerting means for moving the body into an expanded position is also provided. In addition, means for locking the first and second portions together to form the ring so that exterior surfaces of the first and second portions form a substantially continuous and uninterrupted circumferential surface is also provided. The locking means is integrally molded on the first and second portions. The exterior surface of the compression ring exerts a generally uniform pressure on the inner surface of the gasket. The first and second ends of the second portion and portions adjacent thereto may taper to a feather edge so as to provide the substantially continuous and uninterrupted circumferential surface.

The cooperating means may comprise holding means on first and second ends of the first portion. The holding means may comprise lugs. Alternatively, the holding means may be recesses formed in the first and second ends.

The locking means may comprise integrally molded projections on an exterior surface of the first portion and an interior surface of the second portion. The projections may be teeth-like structure. Groups of the teeth of the first portion may be angled in a first direction and groups of the teeth of a second portion may be angled in a second direction opposite the first direction.

The compression ring may further comprise anchoring means for securing the ring against lateral movement in the gasket.

The ring may be formed so as to be expandable into multiple locked positions.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective, partially cut-away and sectioned view of a seal installation constructed in accordance with the present invention.

FIG. 2 is a side elevational view of a portion of a compression ring and seal shown in FIG. 1.

FIG. 3 is a sectional view taken along line 3—3 of FIG. 2.

DETAILED DESCRIPTION OF THE DRAWINGS

Figure 5:
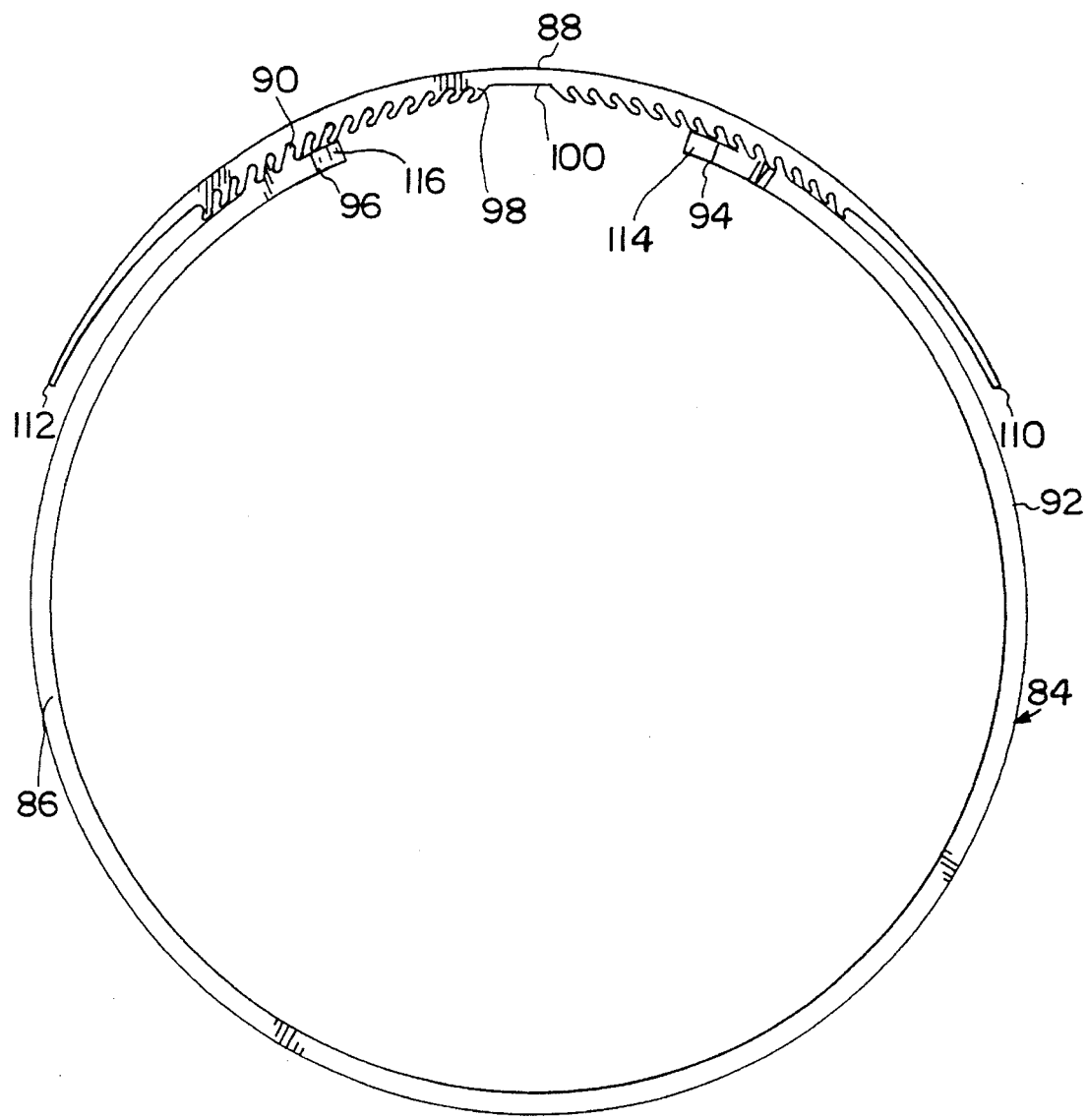
FIG. 5 is a side elevational view of an alternative embodiment of a compression ring of the present invention.

FIG. 1 shows a cut-away portion of a concrete manhole riser or monolithic base 10 which has a pipe-receiving opening 12 in a sidewall thereof. A pipe 14 (a portion of which is shown) is received within opening 12 and extends to a position beyond inner surface 16 of manhole riser or base 10. A gasket 18 is used to seal pipe 14 within opening 12. Gasket 18 has an elongate sleeve portion 20 and is preferably constructed of resilient, elastomeric material, such as rubber, neoprene, or a suitable plastic. Gasket 18 is intended to effect a fluid-tight seal between manhole riser or base 10 and pipe 14 received in opening 12 thereof. A compression ring 22 is coaxially received within a surface of gasket 18. Compression ring 22 abuts raised portion 24 of gasket 18. Compression ring 22 is radially expandable into multiple locked positions. When compression ring 22 is locked into an expanded position, portion 26 of gasket 18 is sealingly compressed against the wall 28 of opening 12 so as to effect the above-described fluid-tight seal.

Compression ring 22 is a one-piece strip 30 of resiliently flexible material made from plastic or equivalent material. Compression ring 22 includes lugs 32 integrally formed or molded on an interior surface 34 of compression ring 22. Lugs 32 cooperate with an expansion unit (not shown), a portion of which mounts on lugs 32 and exerts forces thereon to expand compression ring 22 into a locked position. Lugs 32 have notches 36 formed therein that receive end portions (not shown) of the expansion unit. Teeth-like projections 38 and tabs 40 are also shown in FIG. 1. Both projections 38 and tabs 40 are integrally formed or molded on strip 30. The purpose and function of projections 38 and tabs 40 is described below with reference to FIG. 2.

FIG. 2 shows a portion of compression ring 22 in gasket 18. Strip 30 is shown with a first end 42 overlapping a second end 44. As can be seen, first end 42 on a portion 46 adjacent thereto taper to a feather edge. The tapering of first end 42 and portion 46 provides compression ring 22 with a substantially continuous and uninterrupted exterior circumferential surface 48 (see FIG. 1). This allows compression ring 22 to exert a generally uniform pressure on inner surface 19 of gasket 18 so as to effect a uniform seal between manhole riser or base 10 and gasket 18. Projections 50 are shown extending part of the length of portion 46. Projections 50 increase in height in a direction away from first end 42 until terminating adjacent projections 38. Projections 50 provide strength reinforcement to feathered portion 46 and first end 42 when the second end 44 overlaps first end 42 and compression ring 22 is expanded. Such reinforcement is desirable because feathered portion 46 and first end 42 are necessarily thinner than the remainder of strip 30 and thus have less structural integrity to withstand expansion forces. However, it should be noted that projections 50 are optional and not necessary for the operation of compression ring 22.

Lines 52 and 54 shown in FIG. 2 are intended to represent force vectors provided by an expansion unit (not shown) that expands compression ring 22 into a locked position. As can be seen in FIG. 2, the force vector represented by line 52 is acting on recess 56 formed in second end 44 of strip 30. As can also be seen from FIG. 2, the force vector represented by line 52 acts in a direction generally parallel to the longitudinal length of strip 30. Having the force vector act on recess 56 rather than on one of the lugs 32 thus maximizes the force applied by an expansion unit when expanding compression ring 22 into a locked position. That is, when one of the lugs 32 is used as a mount for an end portion of an expansion unit only a fraction of the force exerted by the expansion unit goes to expanding the compression ring because the force is acting at an angle between zero and ninety degrees relative to the longitudinal axis of strip 30. However, it should be noted that recess 56 is optional and not necessary for the operation of compression ring 22. It should also be noted that even if recess 56 is used, at least one lug 32 at or near second end 44 is necessary in order to release compression ring 22 from an expanded position.

Compression ring 22 is locked into one of a plurality of possible expanded positions via cooperative engagement of teeth-like projections 38 formed on an interior surface 34 of strip 30 with teeth-like projections 58 formed on the portion 60 of strip 30 near second end 44. As can be seen, projections 38 angle in a first direction and projections 58 angle in a second direction opposite that of the direction of projections 38. The angled orientation of projections 38 relative to projections 58 allows strip 30 to be radially expanded yet, at the same time, locks strip 30 in an expanded position so that it will not move in a direction toward the center of compression ring 22. That is, projections 38 provide ramped surfaces 62 over which projections 58 can travel during expansion of ring 22 and recessed cavities 64 into which projections 58 are disposedly engaged so as to prevent movement of strip 30 towards the center of compression ring 22. It should be noted that the projections 38 and 58 may be formed into shapes other than that shown in the drawings and still provide the above-described features associated with those shapes shown in the drawings. Such other shapes are within the scope and spirit of the present invention.

Tabs 40, formed or molded on both sides of inside portion 66 near second end 44 of strip 30, are designed to limit lateral movement of first and second ends 42 and 44 relative to one another. As can be seen in FIG. 3, tabs 40 downwardly extend over a part of outside portion 68 (which is also shown in FIG. 2) of strip 30. A channel 70 is formed between tabs 40 into which at least part of outside portion 68 extends. It should be noted that tabs 40 do not have to be parallel to one another on opposite sides 72 and 74 of inside portion 66 of strip 30. That is, tabs 40 may be diagonally spaced relative to one another on sides 72 and 74 of inside portion 66.

FIG. 3 shows anchoring structure 76 that circumferentially extends around a portion of exterior surface 48. Anchor structure 76 is shown as a lip or protrusion that extends substantially orthogonally from exterior surface 48 and engages a portion of gasket 18 so as to secure compression ring 22 against lateral movement therein. FIG. 1 shows anchoring structure 76 as being generally continuous. It is to be understood, however, that anchoring structure 76 may be formed so as to extend from exterior surface 48 at any angle other than ninety degrees and/or so as to be discontinuous. One possible such alternative structure would be a plurality of circumferentially extending barbs. It is also to be understood that anchoring structure 76 may consist of abrasively forming exterior surface 48 of compression ring 22 so that it allows expansion thereof but resists lateral movement. Such alternatives and others for anchoring structure 76 are still within the scope and spirit of the present invention. It is to be further understood that anchoring structure 76 is optional and unnecessary for the operation of compression ring 22.

Figure 4:
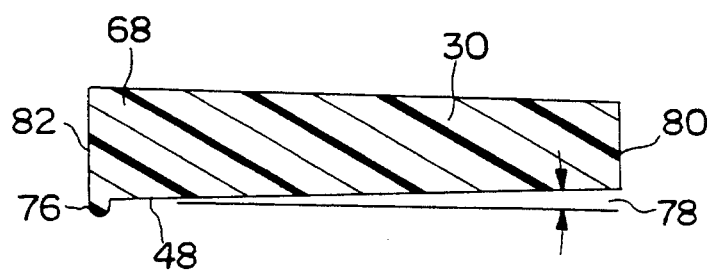
FIG. 4 is a sectional view taken along line 4—4 of FIG. 2.

FIGS. 3 and 4 also show angle 78 of inclination that exists between first edge 80 and second edge 82 along the width of strip 30. This angle of inclination is necessary in order to integrally form or mold compression ring 22 from plastic. That is, the cross-sectional thickness of strip 30 must increase from first edge 80 to second edge 82 in order to remove compression ring 22 from the mold in which it is formed after it has been made. Angle 78 is of known range in the art and has an approximate measure of two degrees.

There are several advantages to injection molding compression ring 22 from plastic, or an equivalent material. One of those advantages is that compression ring 22 can be entirely formed in a single operation. Multiple manufacturing steps are not necessary to construct compression ring 22. If a compression ring is formed from metal, then multiple forming and/or welding steps are necessary to construct a ring comparable to that of compression ring 22. For example, lugs 32 would need to be welded on. This means that a compression ring made from plastic can be manufactured quickly in a single step, rather than multiple steps. Another advantage of forming compression ring 22 from plastic is that it is less expensive to manufacture, requiring less labor and providing several material options. One material from the ring can be made is glass fiber filled nylon 6/6. Another acceptable material is glass fiber filled polypropylene. Other suitable thermoplastics may also be used.

FIG. 5 shows an alternative embodiment of compression ring 22 shown in FIGS. 1–4. However, as with compression ring 22, compression ring 84 shown in FIG. 5 is formed from plastic or an equivalent resiliently flexible material. Compression ring 84 has a C-shaped portion 86 and a separate locking portion 88. Sets of teeth-like projections 90 lie on the exterior surface 92 near distal ends 94 and 96 of C-shaped portion 86. Projections 90 engage teeth-like projections 98 formed on portions of interior surface 100 of locking portion 88. As can be seen, groups of projections 90 angle in a first direction and groups of projections 98 angle in a second direction opposite the first direction. Projections 90 and 98 cooperatively engage one another so as to lock compression ring 84 in a plurality of expanded positions. While projections 90 and 98 are shown as teeth-like structure, it is to be understood that other equivalent structure are within the scope and spirit of the present invention.

As can be seen in FIG. 5, distal ends 110 and 112 of locking portion 88 and portions adjacent thereto taper to a feather edge. This allows compression ring 84 to present a substantially continuous and uninterrupted exterior circumferential surface in inner surface 19 of gasket 18. Although not shown, as with compression ring 22, protrusions or other equivalent structure may be provided in the area of the feathered portions of locking portion 88 so as to provide strength reinforcement thereto.

Lugs 114 and 116 allow for attachment of a portion of an expansion unit (not shown) thereto so that compression ring 84 may be expanded and locked into position via locking portion 88. Lugs 114 and 116 also allow compression ring 84 to be released from an expanded position and removed from gasket. It should be noted that, although not shown, either or both lugs 114 and 116 could be replaced with recesses as described above with reference to compression ring 22.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A compression ring for exerting an outwardly, radially directed force on an inner surface of a gasket to compress the gasket into sealing engagement with a wall of an opening, comprising:

a first portion having opposite ends and made from a resiliently flexible material;

a second portion made from a resiliently flexible material;

a pair of abutments integrally formed on said first portion for engagement with a force exerting means for moving said first portion to an expanded position; and locking structures integrally formed on each of said first and second portions which engage and cooperate together to lock said first and second portions together to form a ring, said locking structures comprising a plurality of projections on each of said opposite ends of said first portion, said second portion including first and second tapered ends which taper to a feather edge, said first and second tapered ends extending substantially beyond ends of said first portion, along an outer surface thereof when said first and second portions are locked together to form the ring, whereby exterior surfaces of said first and second portions form a substantially continuous and uninterrupted circumferential surface that exerts a generally uniform pressure on the inner surface of a gasket.

2. The compression ring of claim 1, wherein said first and second portions are made of plastic.

3. The compression ring of claim 2, wherein said pair of abutments comprise lugs.

4. The compression ring of claim 2, wherein said pair of abutments comprise recesses formed in first and second ends of said first portion.

5. The compression ring of claim 1, wherein said locking structures comprise integrally formed projections on an exterior surface of said first portion and on an interior surface of said second portion.

6. The compression ring of claim 5, wherein said projections are teeth-like structure.

7. The compression ring of claim 6, wherein groups of said teeth on said first portion are angled in a first direction and groups of said teeth on said second portion are angled in a second direction opposite the first direction.

8. The compression ring of claim 1, further comprising integrally formed anchoring structures for securing said ring against lateral movement in said gasket.

9. The compression ring of claim 1, wherein said ring is expandable into multiple locked positions.

* * * * *